United States Patent
Erhart et al.

(10) Patent No.: US 7,711,095 B2
(45) Date of Patent: May 4, 2010

(54) COORDINATION OF CONTENT STREAMS IN INTERACTIVE VOICE RESPONSE SYSTEMS

(75) Inventors: George William Erhart, Loveland, CO (US); Valentine C. Matula, Granville, OH (US); David Joseph Skiba, Golden, CO (US)

(73) Assignee: Avaya Inc., Basking Ridge, NJ (US)

( * ) Notice: Subject to any disclaimer, the term of this patent is extended or adjusted under 35 U.S.C. 154(b) by 1192 days.

(21) Appl. No.: 11/235,890

(22) Filed: Sep. 27, 2005

(65) Prior Publication Data

US 2006/0203978 A1 Sep. 14, 2006

Related U.S. Application Data

(60) Provisional application No. 60/660,249, filed on Mar. 10, 2005.

(51) Int. Cl.
*H04M 11/00* (2006.01)
(52) U.S. Cl. .............. 379/88.13; 379/88.18; 709/231
(58) Field of Classification Search .............. 379/88.17, 379/88.13, 88.18
See application file for complete search history.

(56) References Cited

U.S. PATENT DOCUMENTS

| 5,737,393 | A | 4/1998 | Wolf |
| 5,915,001 | A * | 6/1999 | Uppaluru ............... 379/88.22 |
| 6,012,089 | A | 1/2000 | Hasegawa |
| 6,487,277 | B2 | 11/2002 | Beyda et al. |
| 6,567,854 | B1 | 5/2003 | Olshansky et al. |
| 6,587,822 | B2 | 7/2003 | Brown et al. |
| 6,631,186 | B1 | 10/2003 | Adams et al. |
| 6,677,968 | B1 | 1/2004 | Appelman |
| 6,691,162 | B1 | 2/2004 | Wick |
| 6,714,793 | B1 | 3/2004 | Carey et al. |
| 6,728,357 | B2 | 4/2004 | O'Neal et al. |
| 6,735,193 | B1 | 5/2004 | Bauer et al. |
| 6,750,881 | B1 | 6/2004 | Appelman |
| 6,848,008 | B1 | 1/2005 | Sevanto et al. |
| 6,904,143 | B1 | 6/2005 | Peterson et al. |
| 7,062,709 | B2 | 6/2006 | Cheung |

(Continued)

FOREIGN PATENT DOCUMENTS

WO 2005029903 A1 3/2005

OTHER PUBLICATIONS

Meister, "International Patent Application No. 06251246.2 Examination Report", Mar. 19, 2008, Publisher: EPO, Published in: EP.

(Continued)

*Primary Examiner*—Simon Sing
(74) *Attorney, Agent, or Firm*—DeMont & Breyer, LLC (57) ABSTRACT

A method and apparatus are disclosed that enable an interactive voice response (IVR) system to deliver content streams of various media types (e.g., video, audio, etc.) to telecommunications terminals. The illustrative embodiment provides extensions to the Voice extensible Markup Language (VXML) standard that enable an IVR system script to specify the playback order, timing, and coordination of multiple content streams (e.g., whether an audio stream and a video stream should be played back concurrently or serially; whether a particular content stream should finish before playback of another content stream commences; whether a content stream that is currently playing should be stopped and supplanted with another content stream, etc.).

17 Claims, 7 Drawing Sheets

U.S. PATENT DOCUMENTS

| | | | |
|---|---|---|---|
| 7,142,661 | B2 | 11/2006 | Erhart et al. |
| 7,164,762 | B2 | 1/2007 | Hanson et al. |
| 7,349,700 | B1 | 3/2008 | Goldfinger |
| 7,471,776 | B2 | 12/2008 | Vollkommer et al. |
| 2002/0198719 | A1* | 12/2002 | Gergic et al. ............. 704/270.1 |
| 2003/0026409 | A1 | 2/2003 | Bushey et al. |
| 2004/0071275 | A1 | 4/2004 | Bowater et al. |
| 2004/0073643 | A1 | 4/2004 | Hayes et al. |
| 2004/0218737 | A1 | 11/2004 | Kelly |
| 2005/0038876 | A1 | 2/2005 | Chaudhuri |
| 2005/0104909 | A1 | 5/2005 | Okamura et al. |
| 2005/0141694 | A1 | 6/2005 | Wengrovitz |
| 2005/0276399 | A1* | 12/2005 | Thompson ............... 379/93.12 |
| 2006/0064729 | A1 | 3/2006 | Steading |
| 2006/0282783 | A1 | 12/2006 | Covell et al. |
| 2007/0230683 | A1 | 10/2007 | Brown et al. |
| 2008/0056456 | A1 | 3/2008 | Erhart et al. |

OTHER PUBLICATIONS

Di Fabbrizio et al., "Unifying Conversational Multimedia Interfaces for Accessing Network Services Across Communication Devices", "ICME 2000", Jul. 30, 2000, pp. 653-656, vol. 2, Publisher: IEEE International Conference on Multimedia and Expo (ICME 2000), Published in: US.

Hyam, Kristy, "CA Application No. 2537887 Office Action", Jan. 8, 2009, Publisher: CIPO, Published in: CA.

Kasthuri Mohan, "IN Application No. 413/CHE/2006 Examination Report", Nov. 25, 2008, Publisher: Government of India Patent Office, Published in: IN.

Di Fabbrizio G. et al, "Unifying conversational multimedia interfaces for accessing network services across communication devices", Multimedia and Expo, ICME 2000, IEEE International conference on New York, NY, USA 30 Jul. 30-Aug. 2, 2000, Piscataway, NJ, USA, vol. 2, Jul. 30, 2000, pp. 653-656, XP010513097 ISBN: 0-7803-6536-4.

Jennifer L. Beckham et al, "Towards SMIL as a Foundation for Multimodal, Multimedia applications", Eurospeech 2001, European conference on speech communication and technology, vol. 2, Sep. 7, 2001, pp. 1363-1366, XP007004600.

Morales, I., "VoiceXML, CCXML, SALT. Architectural tools for enabling speech applications", XML journal [Online] vol. 3, No. 9, 2002, XP002426773 retrieved from the internet: URL:http//xml.syscon.com/read/40476_p.htm> [retrieved on Mar. 26, 2007].

Auburn R J (Editor), "Voice browser call control: CCXML version 1.0—W3C working draft Jan. 11, 2005", W3C, Jan. 11, 2005, XP002397221, paragraph [7.2.2.1], paragraph [09.1], Appendix D—VoiceXML 2.0 Integration Details.

Intel Corporation, "VoiceXML Solution from VoiceGenie and Intel Delivers Open, Standards-Based Voice Services Platform" [Online] Jun. 2004, pp. 1-8, XP002397222, Retrieved from the Internet: URL:http://download.intel.com/network/csp/pdf/9127wp.pdf> [retrieved on Aug. 31, 2006].

Hewlett-Packard Company, "HP OpenCall Media Platform—Browser Runtime Environment—Installation and Configuration Guide—For OCMP Release 2.4—Second Edition" [Online} 2004, pp. 1-60, XP002397224, Retrieved from the Internet: URL:http://docs.hp.com/en/5190/Instalationand Configuration.pdf? [retrieved on Aug. 31, 2006].

, "U.S. Appl. No. 11/188,542 Office Action", Dec. 5, 2008, Publisher: USPTO, Published in: US.

Hoque, Nafiz E., "U.S. Appl. No. 11/240,092 Office Action Dec. 10, 2009", , Publisher: USPTO, Published in: US.

Hoque, Nafiz E., "U.S. Appl. No. 11/240,092 Office Action Jun. 11, 2009", , Publisher: USPTO, Published in: US.

Cremer, Jan, "EP Application No. 06251246.2 Search Report and Written Opinion Apr. 25, 2007", , Publisher: EPO, Published in: EP.

Gauthier, Gerald, "U.S. Appl. No. 11/188,542 Office Action Mar. 2, 2009", , Publisher: USPTO, Published in: US.

Gauthier, Gerald, "U.S. Appl. No. 11/188,542 Office Action Sep. 15, 2009", , Publisher: USPTO, Published in: US.

Gauthier, Gerald, "U.S. Appl. No. 11/188,542 Office Action Mar. 1, 2010" Publisher: USPTO, Published in: US.

El-Zoobi, Maria, "U.S. Appl. No. 11/360,256 Office Action Mar. 9, 2010" Publisher: USPTO, Published in: US.

* cited by examiner

```
<?xml version="1.0"?>
<vxml version="2.0">
<menu id="menu1" scope="document" dtmf="true">
    <prompt> Welcome to XYZ Corp! Please choose one of the following options: <enumerate/> </prompt>
    <choice dtmf="1" next="#formSales">    Sales,       </choice>
    <choice dtmf="*2" next="#formMarket">  Marketing,   </choice>
    <choice dtmf="3" next="#formSupport">  Support      </choice>
</menu>
<form id="formSales">
    <field name="SalesInput">
        <prompt>
            I will now transfer you to sales
        </prompt>
    </field>
</form>
<form id="formMarket">
    <field name="MarketInput">
        <prompt> I will now transfer you to marketing </prompt>
    </field>
</form>
<form id="formSupport">
    <field name="SupportInput">
        <prompt> I will now transfer you to support </prompt>
    </field>
</form>
</vxml>
```

```
<?xml version="1.0"?>
<vxml version="2.0">
<menu id="menu1" scope="document" dtmf="true">
   <prompt>
      <video chan="video" persist="true"
         1. Sales
         2. Marketing
         3. Support
      </video>
   </prompt>
   <prompt> Welcome to XYZ Corp! Please choose one of the following options: <enumerate/> </prompt>
   <prompt>
      <video chan="video" persist="false" src="http://video.svr/animatedLogo.gif </video>
   </prompt>
   <prompt> <audio src="http://video.svr/jingle1.mp3 /> </prompt>
   <choice dtmf="1"  next="#formSales">   Sales,     </choice>
   <choice dtmf="*2" next="#formMarket"> Marketing, </choice>
   <choice dtmf="3"  next="#formSupport"> Support    </choice>
</menu>
<form id="formSales">
   <block>
      <prompt>
         <video chan="video+audio" persist="false" src="http://video.svr/demo.3gp </video>
         <video chan="video"                        persist="false" src="http://video.svr/animatedChart.gif </video>
      </prompt>
      <prompt> <audio src="http://video.svr/jingle2.mp3 /> </prompt>
      <prompt>
         <video chan="video+audio" persist="true" src="http://video.svr/trailer.3gp </video>
      </prompt>
   </block>
   <field name="SalesInput">
      <prompt>
         I will now transfer you to sales
      </prompt>
   </field>
</form>
...
</vxml>
```

COORDINATION OF CONTENT STREAMS IN INTERACTIVE VOICE RESPONSE SYSTEMS

CROSS-REFERENCE TO RELATED APPLICATIONS

This application claims the benefit of U.S. provisional application Ser. No. 60/660,249, filed Mar. 10, 2005, entitled "System and Method for Multimodal Content Delivery in Interactive Response Systems,", which is also incorporated by reference.

FIELD OF THE INVENTION

The present invention relates to telecommunications in general, and, more particularly, to coordinating the delivery of multiple content streams from an interactive voice response system.

BACKGROUND OF THE INVENTION

Many enterprises employ an interactive voice response (IVR) system that handles calls from telecommunications terminals. An interactive voice response system typically presents a hierarchy of menus to the caller, and prompts the caller for input to navigate the menus and to supply information to the IVR system. For example, a caller might touch the "3" key of his terminal's keypad, or say the word "three", to choose the third option in a menu. Similarly, a caller might specify his bank account number to the interactive voice response system by inputting the digits via the keypad, or by saying the digits. In many interactive voice response systems the caller can connect to a person in the enterprise by either selecting an appropriate menu option, or by entering the telephone extension associated with that person.

Figure 1:
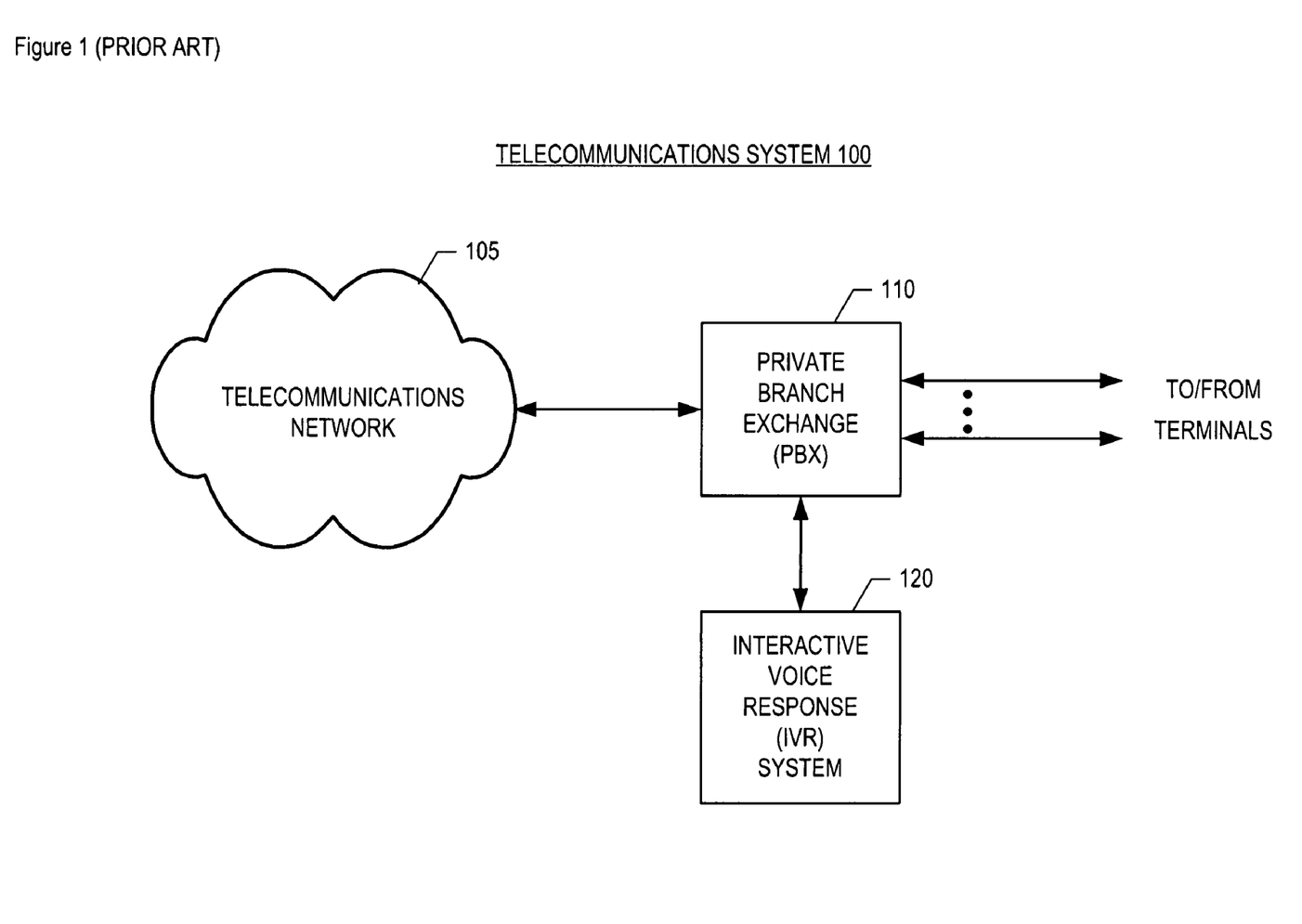
FIG. 1 depicts telecommunications system 100 in accordance with the prior art.

FIG. 1 depicts telecommunications system 100 in accordance with the prior art. Telecommunications system 100 comprises telecommunications network 105, private branch exchange (PBX) 110, and interactive voice response system 120, interconnected as shown.

Telecommunications network 105 is a network such as the Public Switched Telephone Network [PSTN], the Internet, etc. that carries a call from a telecommunications terminal (e.g., a telephone, a personal digital assistant [PDA], etc.) to private branch exchange 110. A call might be a conventional voice telephone call, a text-based instant messaging (IM) session, a Voice over Internet Protocol (VoIP) call, etc.

Private branch exchange (PBX) 110 receives incoming calls from telecommunications network 105 and directs the calls to interactive voice response (IVR) system 120 or to one of a plurality of telecommunications terminals within the enterprise, depending on how private branch exchange 110 is programmed or configured. For example, in an enterprise call center, private branch exchange 110 might comprise logic for routing calls to service agents' terminals based on criteria such as how busy various service agents have been in a recent time interval, the telephone number called, and so forth. In addition, private branch exchange 110 might be programmed or configured so that an incoming call is initially routed to interactive voice response (IVR) system 120, and, based on caller input to IVR system 120, subsequently redirected back to PBX 110 for routing to an appropriate telecommunications terminal within the enterprise. Private branch exchange (PBX) 110 also receives outbound signals from telecommunications terminals within the enterprise and from interactive voice response (IVR) system 120, and transmits the signals on to telecommunications network 105 for delivery to a caller's terminal.

Interactive voice response (IVR) system 120 is a data-processing system that presents one or more menus to a caller and receives caller input (e.g., speech signals, keypad input, etc.), as described above, via private branch exchange 110. Interactive voice response system (IVR) 120 is typically programmable and performs its tasks by executing one or more instances of an IVR system application. An IVR system application typically comprises one or more scripts that specify what speech is generated by interactive voice response system 120, what input to collect from the caller, and what actions to take in response to caller input. For example, an IVR system application might comprise a top-level script that presents a main menu to the caller, and additional scripts that correspond to each of the menu options (e.g., a script for reviewing bank account balances, a script for making a transfer of funds between accounts, etc.).

A popular language for such scripts is the Voice extensible Markup Language (abbreviated VoiceXML or VXML). The Voice extensible Markup Language is an application of the eXtensible Markup Language, abbreviated XML, which enables the creation of customized tags for defining, transmitting, validating, and interpretation of data between two applications, organizations, etc. The Voice extensible Markup Language enables dialogs that feature synthesized speech, digitized audio, recognition of spoken and keyed input, recording of spoken input, and telephony. A primary objective of VXML is to bring the advantages of web-based development and content delivery to interactive voice response system applications.

Figure 2:
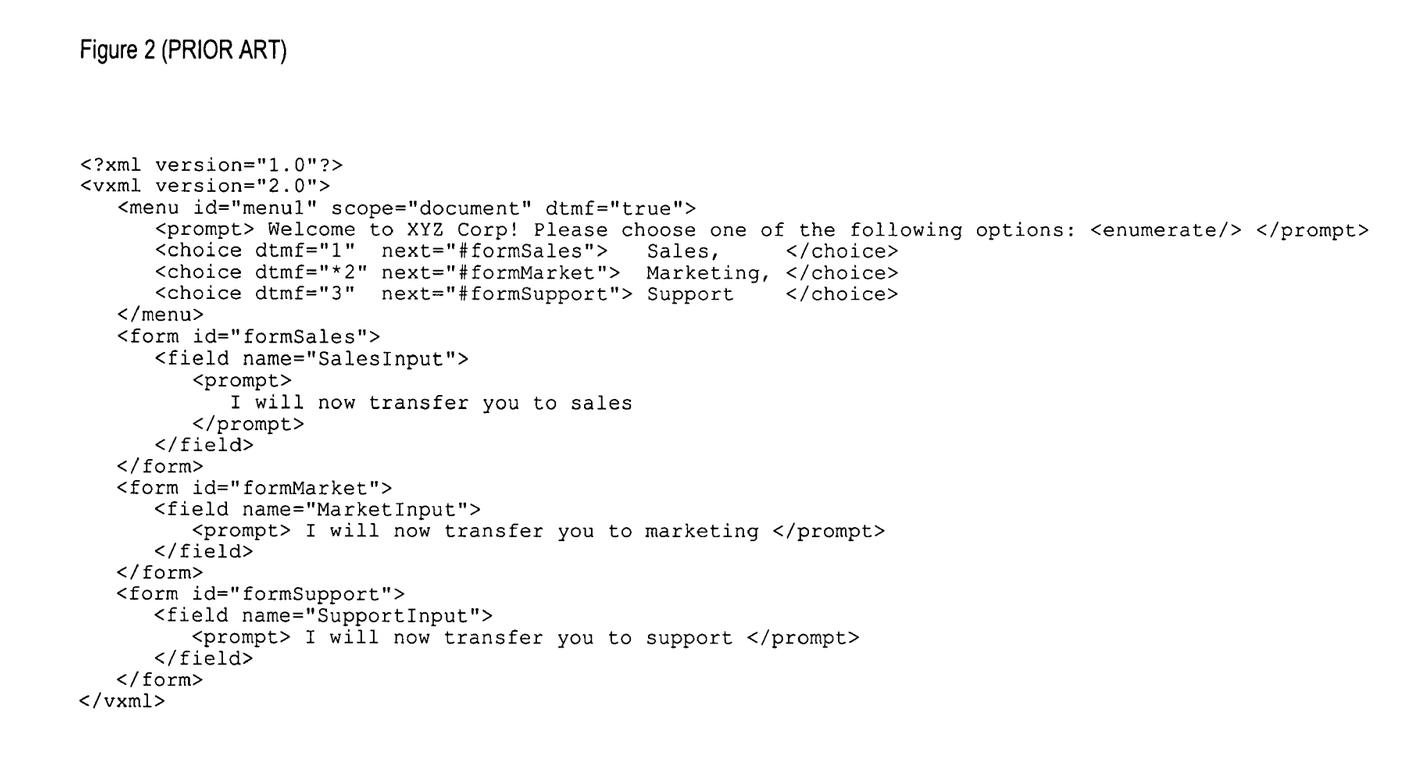
FIG. 2 depicts an exemplary Voice extensible Markup Language (VXML) script, in accordance with the prior art.

FIG. 2 depicts an exemplary Voice extensible Markup Language (VXML) script (also known as a VXML document or page), in accordance with the prior art. The VXML script, when executed by interactive voice response system 120, presents a menu with three options; the first option is for transferring the call to the sales department, the second option is for transferring the call to the marketing department, and the third option is for transferring the call to the customer support department. Audio content (in particular, synthesized speech) that corresponds to text between the <prompt> and </prompt> tags is generated by interactive voice response system 120 and transmitted to the caller.

SUMMARY OF THE INVENTION

As video displays become ubiquitous in telecommunications terminals, it can be advantageous to deliver video content to a telecommunications terminal during a call with an interactive voice response (IVR) system, in addition to audio content. For example, a user of a telecommunications terminal who is ordering apparel via an IVR system might receive a video content stream related to a particular item (e.g., depicting a model who is wearing the item, depicting the different available colors for the item, etc.). Furthermore, in some instances it might be desirable to deliver an audio content stream (e.g., music, news, etc.) to the user, perhaps during silent periods in the call, or perhaps as background audio throughout the entire call.

The illustrative embodiment of the present invention enables an IVR system to deliver content streams of various media types (e.g., video, audio, etc.) to telecommunications terminals via the addition of extensions to the Voice extensible Markup Language (VXML) standard. In addition, the illustrative embodiment provides VXML extensions that enable an IVR system script to specify the playback order, timing, and coordination of multiple content streams (e.g., whether an audio stream and a video stream should be played back concurrently or serially; whether a particular content stream should finish before playback of another content stream commences; whether a content stream that is currently playing should be stopped and supplanted with another content stream, etc.).

The illustrative embodiment comprises: (a) receiving a list of one or more identifiers at a thread of an interactive voice response system, (i) wherein each of the identifiers is associated with one of a plurality of content streams, (ii) wherein each of the content streams has one or more of a plurality of media types, (iii) wherein the list specifies a playback order for the content streams, and (iv) wherein the thread is associated with one of the media types T and with a call that involves the interactive voice response system and a telecommunications terminal; and (b) executing in the thread a command for initiating delivery of one of the content streams S to the telecommunications terminal, (i) wherein the content stream S has the media type T, and (ii) wherein the time τ at which delivery of the content stream S begins is based on the playback order.

DETAILED DESCRIPTION

Figure 3:
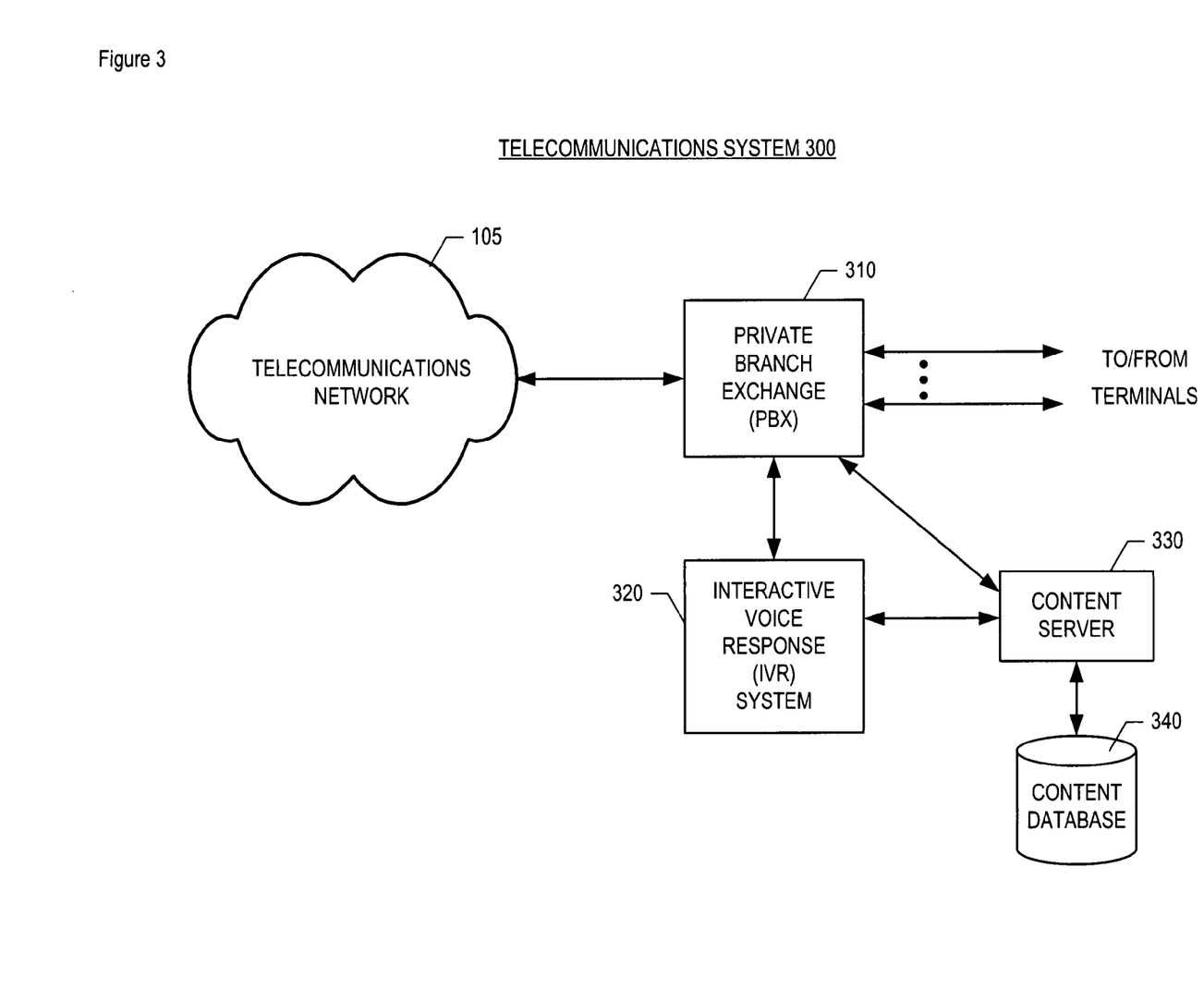
FIG. 3 depicts telecommunications system 300 in accordance with the illustrative embodiment of the present invention.

FIG. 3 depicts telecommunications system 300 in accordance with the illustrative embodiment of the present invention. Telecommunications system 300 comprises telecommunications network 105, private branch exchange (PBX) 310, interactive voice response system 320, content server 330, and content database 340, interconnected as shown.

Private branch exchange (PBX) 310 provides all the functionality of private branch exchange (PBX) 110 of the prior art, and is also capable of receiving streamed content (e.g., audio, video, multimedia, etc.) from content server 330, of forwarding streamed content on to telecommunications network 105 for delivery to a caller's terminal, and of transmitting signals related to streamed content to content server 330. Furthermore, in addition to conventional telephony-based signaling and voice signals, private branch exchange 310 is also capable of transmitting and receiving Internet Protocol (IP) data packets, Session Initiation Protocol (SIP) messages, Voice over IP (VoIP) traffic, and stream-related messages (e.g., Real Time Streaming Protocol [RTSP] messages, etc.) to and from IVR system 320. It will be clear to those skilled in the art, after reading this specification, how to make and use private branch exchange (PBX) 310.

Interactive voice response system 320 provides all the functionality of interactive voice response system 120 of the prior art, and is also capable of transmitting commands to content server 330 (e.g., starting playback of a content stream, stopping playback of the content stream, queueing another content stream, etc.) and of receiving information from content server 330 (e.g., an indication that playback of a content stream has begun, an indication that playback of a content stream has completed, etc.). It will be clear to those skilled in the art, after reading this specification, how to make and use interactive voice response system 320.

Content server 330 is capable of retrieving content from content database 340, of buffering and delivering a content stream to a calling terminal via private branch exchange 310, of receiving commands from interactive voice response (IVR) system 320 (e.g., to start playback of a content stream, to queue another content stream, etc.), of transmitting status information to interactive voice response (IVR) system 310, and of generating content (e.g., dynamically generating a video of rendered text, etc.) in well-known fashion. It will be clear to those skilled in the art, after reading this specification, how to make and use content server 330.

Content database 340 is capable of storing a plurality of multimedia content (e.g., video content, audio content, etc.) and of retrieving content in response to commands from content server 330, in well-known fashion. It will be clear to those skilled in the art, after reading this specification, how to make and use content database 340.

As will be appreciated by those skilled in the art, some embodiments of the present invention might employ an architecture for telecommunications system 300 that is different than that of the illustrative embodiment (e.g., IVR system 320 and content server 330 might reside on a common server, etc.). It will be clear to those skilled in the art, after reading this specification, how to make and use such alternative architectures.

Figure 4:
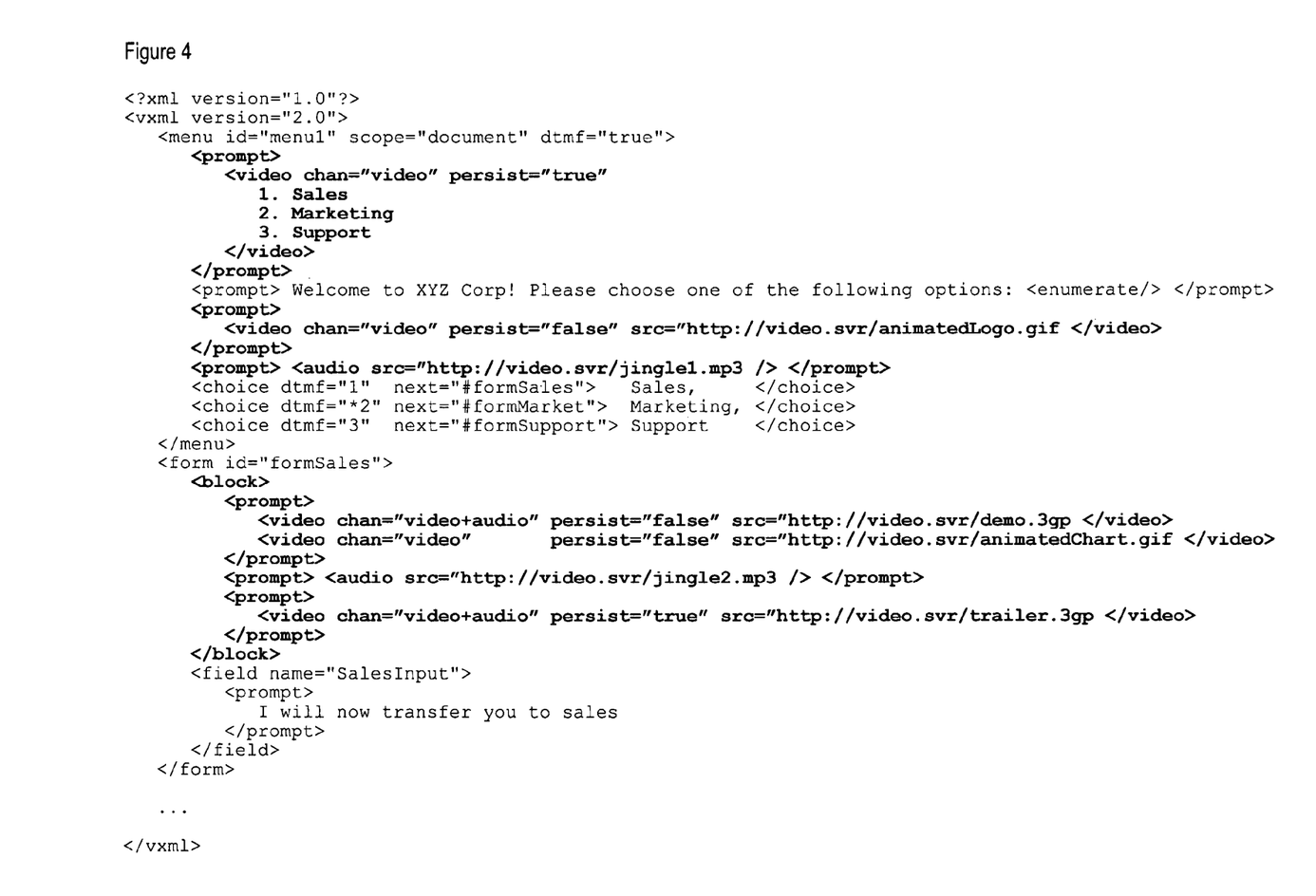
FIG. 4 depicts an exemplary Voice extensible Markup Language (VXML) script, in accordance with the illustrative embodiment of the present invention.

FIG. 4 depicts an exemplary Voice Extensible Markup Language (VXML) script, in accordance with the illustrative embodiment of the present invention. The script is the same as the script of FIG. 2 of the prior art, with the addition of lines of code depicted in boldface. As shown in FIG. 4, the script now contains prompts that are audio and video content streams, in addition to speech prompts. In particular, the menu presentation comprises, in addition to speech: a video representation of the menu choices, an animated logo (e.g., a corporate logo, etc.), and an audio jingle. Furthermore, when the user selects choice 1 (sales), interactive voice response (IVR) system 310 delivers an audiovisual stream "demo.3gp," an animated chart (e.g., an animated pie chart, etc.), an audio stream "jingle2.mp3,", and an audiovisual stream "trailer.3gp."

As shown in FIG. 4, the illustrative embodiment provides various extensions to the VXML standard. First, a prompt can specify its particular media type(s) (e.g., audio-only, video-only, audiovisual, etc.). Second, prompts that include video can include a Boolean persist attribute that indicates whether the video should remain active until the next video prompt is encountered in the application. When the persist attribute for a video prompt is true, the VXML interpreter will proceed to the next prompt once the video has started; conversely, when the persist attribute for a video prompt is false (or no persist attribute is specified, in accordance with the illustrative embodiment), the VXML interpreter will not proceed to the next prompt until the video prompt has finished. As will be appreciated by those skilled in the art, although in the illustrative embodiment a persist attribute of true results in the VXML interpreter waiting for the video prompt to finish before proceeding to any subsequent prompt (i.e., video or non-video), in some embodiments the VXML interpreter might proceed to a subsequent non-video prompt before the video prompt has finished.

The illustrative embodiment thus enables a script to specify the manner in which multiple prompts should be presented via the order in which the prompts are enumerated, via the values of the persist attributes, and via the order and duration of interlaced prompt types.

Figure 5:
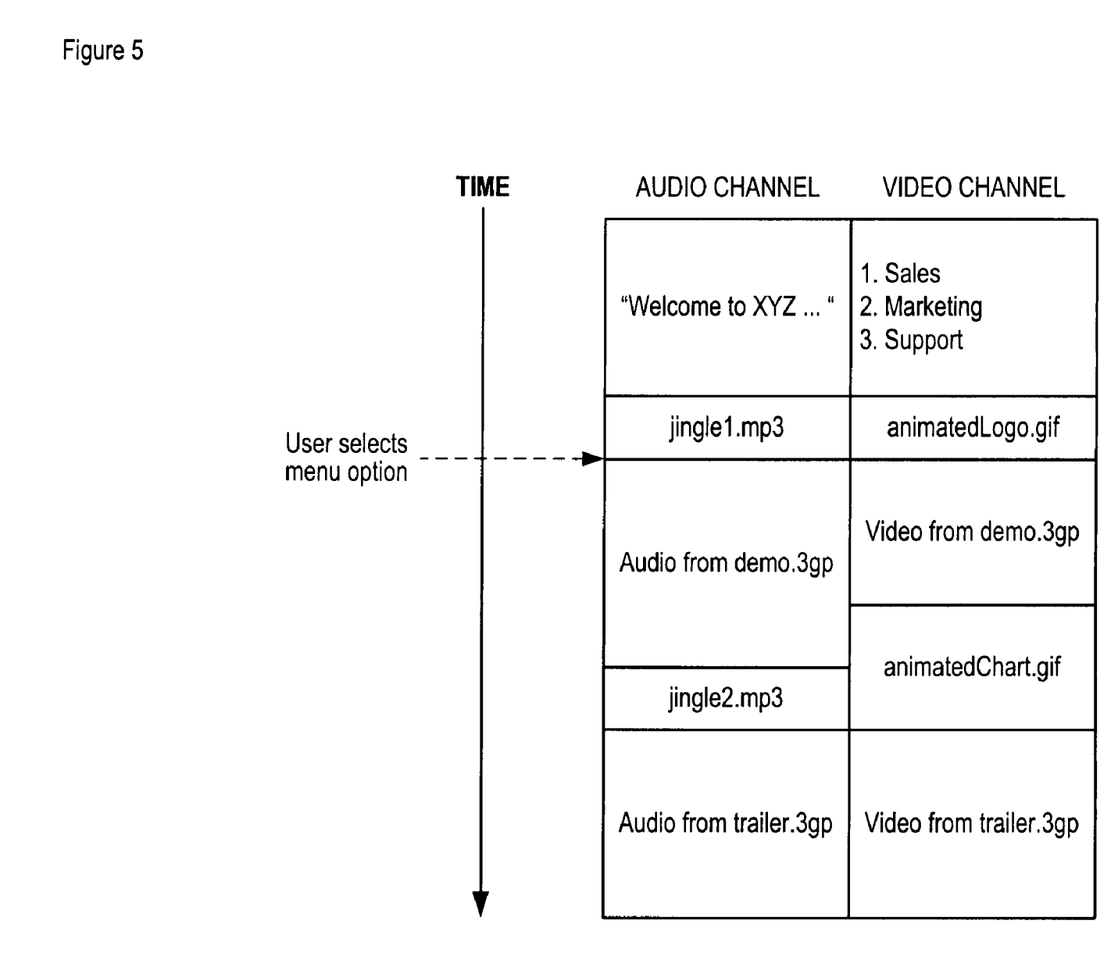
FIG. 5 depicts an audio/video channel timing diagram that corresponds to the VXML script of FIG. 4, in accordance with the illustrative embodiment of the present invention.

FIG. 5 depicts a timing diagram of the audio and video channels for a call that is handled by the VXML script of FIG. 4, in accordance with the illustrative embodiment of the present invention. At the start of the call, the synthesized speech of the menu is played concurrently with a video version of the menu, and then audio stream jingle1 is played concurrently with the video of animatedLogo. Subsequently, after the caller has selected an option from the menu, the script: plays the audio and video streams of source demo concurrently; presents an animated chart in place of the video portion of demo while the audio portion of demo is still playing; plays audio stream jingle2 concurrently with the animated chart after playback of demo has finished; and plays the audio and video streams of source trailer concurrently after jingle2 has finished.

Figure 6:
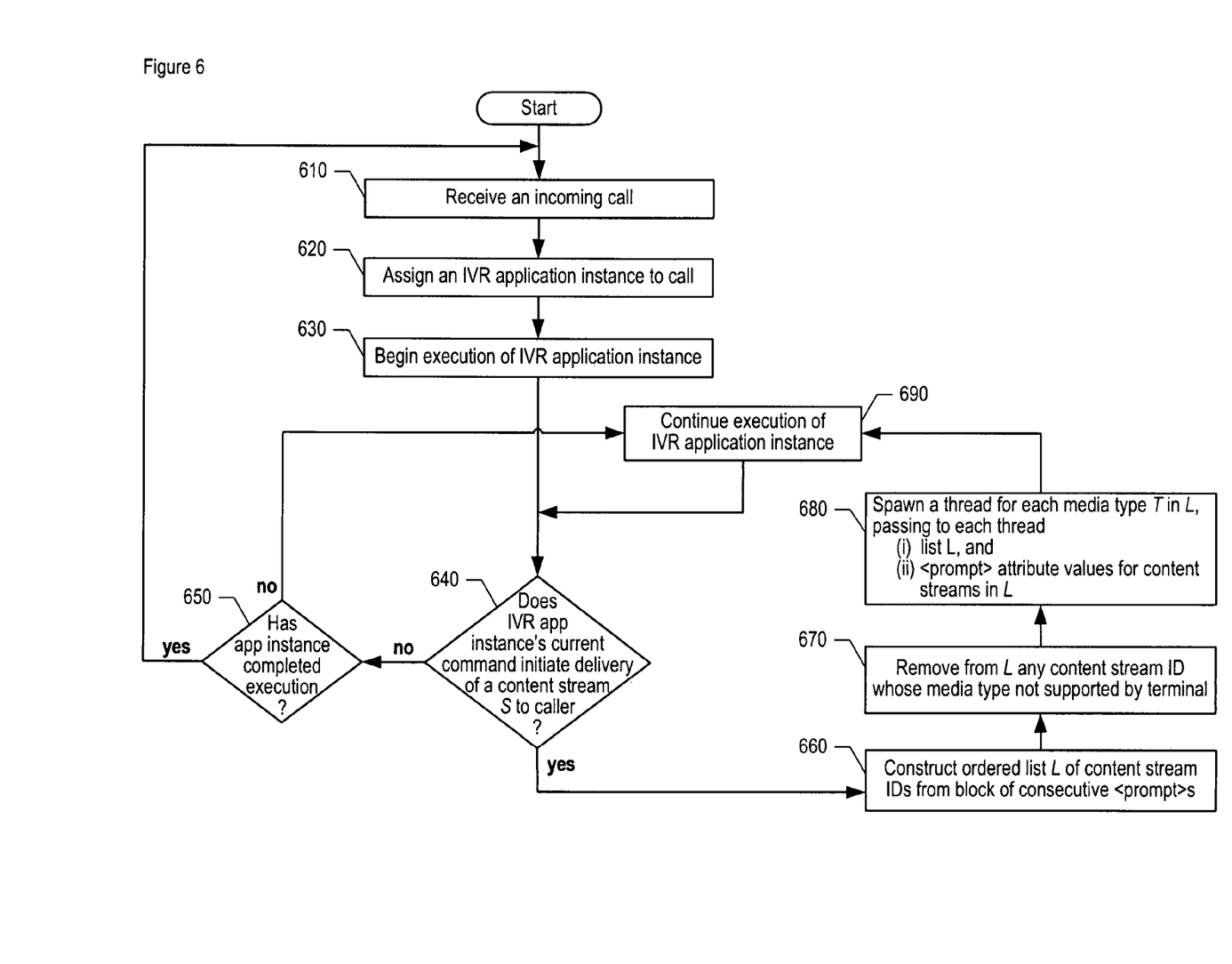
FIG. 6 depicts a flowchart of the salient tasks of interactive voice response system 320, as shown in FIG. 3, in accordance with the illustrative embodiment of the present invention.

FIG. 6 depicts a flowchart of the salient tasks of interactive voice response (IVR) system 320, in accordance with the illustrative embodiment of the present invention. It will be clear to those skilled in the art which tasks depicted in FIG. 6 can be performed simultaneously or in a different order than that depicted.

At task 610, an incoming call is received at interactive voice response system 320, in well-known fashion.

At task 620, interactive voice response (IVR) system 320 assigns an instance of an appropriate IVR system application to the incoming call, in well-known fashion. As will be appreciated by those skilled in the art, although in the illustrative embodiments an instance of an IVR system application handles one incoming call at a time, in some other embodiments of the present invention an application instance might handle a plurality of calls concurrently.

At task 630, interactive voice response (IVR) system 320 begins executing the IVR application instance, in well-known fashion.

At task 640, interactive voice response (IVR) system 320 checks whether the current command to be executed in the IVR application instance initiates delivery of a content stream S to the calling telecommunications terminal. If so, execution continues at task 660, otherwise, execution proceeds to task 650.

At task 650, interactive voice response (IVR) system 320 checks whether the IVR application instance's execution has completed. If so, execution continues back at task 610 for the next incoming call; otherwise, execution proceeds to task 690.

At task 660, interactive voice response (IVR) system 320 constructs an ordered list L of content stream identifiers from the block of consecutive <prompt>s that starts at the current command. For example, in the script of FIG. 4, the block of consecutive <prompt>s in the <menu> block might correspond to ordered list:

$L$=(menuVideo1, speech1, animatedLogo.gif, jingle1.mp3)

where menuvideo1 is an identifier that is dynamically generated by the VXML interpreter and corresponds to the "literal" video in the script that displays the menu options;

speech1 is an identifier that is dynamically generated by the VXML interpreter and corresponds to the "literal" speech in the script that welcomes the caller and enumerates the menu options;

animatedLogo.gif is the filename of a video source; and jingle1.mp3 is the filename of an audio source.

Of course, might be only 1 prompt-> list of 1 element.

Similarly, the block of consecutive <prompt>s in the form-Sales <form> block might correspond to ordered list:

$L$=(demo.3gp.video, demo.3gp.audio, animatedchart.gif, jingle2.mp3, trailer.3gp.video, trailer.3gp.audio)

where demo.3gp.video denotes the video portion of file demo.3gp;

demo.3gp.audio denotes the audio portion of file demo.3gp;

animatedChart.gif is the filename of a video source;

jingle2.mp3 is the filename of an audio source;

trailer.3gp.video denotes the video portion of file trailer.3gp; and trailer.3gp.audio denotes the audio portion of file trailer.3gp.

At task 670, interactive voice response (IVR) system 320 removes from list L any content stream identifier whose media type is not supported by the telecommunications terminal.

At task 680, interactive voice response (IVR) system 320 spawns a thread for each media type T in list L. For example, in the script of FIG. 4 IVR system 320 would spawn a thread for audio and a thread for video for both instantiations of list L. Each thread is passed list L and the <prompt> attribute values for each content stream in L. As will be appreciated by those skilled in the art, information can be passed to threads in a variety of ways, such as via a memory pointer, via an operating system inter-thread communication mechanism, and so forth. The operation of the threads is described in detail below and with respect to FIG. 7.

At task 690, interactive voice response (IVR) system 320 continues the execution of the IVR application instance, in well-known fashion. After task 690, execution continues back at task 640.

Figure 7:
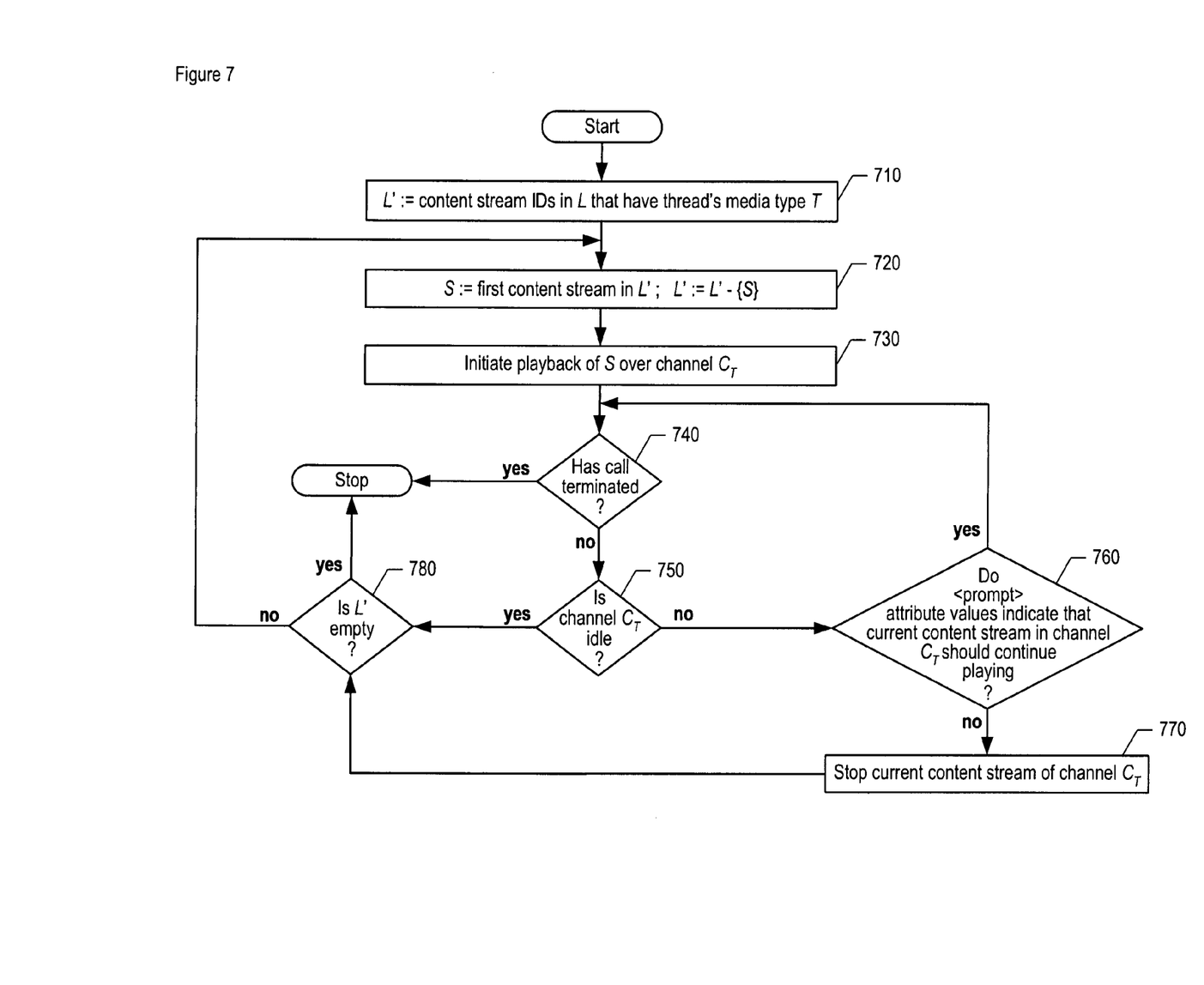
FIG. 7 depicts a flowchart of the salient tasks of a thread that is spawned at task 680 of FIG. 6, in accordance with the illustrative embodiment of the present invention.

FIG. 7 depicts a flowchart of the salient tasks of a thread that is spawned at task 680 of FIG. 6, in accordance with the illustrative embodiment of the present invention. It will be clear to those skilled in the art which tasks depicted in FIG. 7 can be performed simultaneously or in a different order than that depicted.

At task 710, the thread initializes ordered list L' to the content stream identifiers in list L that have the same media type T as the thread.

At task 720, the thread sets variable S to the first content stream in list L' and removes S from list L'.

At task 730, the thread initiates playback of content stream S over $C_T$, the channel that corresponds to media type T.

At task 740, the thread checks whether the call has terminated. If so, the thread terminates, otherwise, execution continues at task 750.

At task 750, the thread checks whether channel $C_T$ is idle. If so, the thread continues its execution at task 780, otherwise execution proceeds to task 760.

At task 760, the thread determines whether the <prompt> attribute values indicate that the current content stream in channel $C_T$ should continue playing (e.g., the current content stream has its persist attribute equal to true and content streams of other media types are still playing, etc.). If so, execution continues back at task 740, otherwise execution proceeds to task 770.

As will be appreciated by those skilled in the art, some embodiments of the present invention might employ other attributes in addition to, or instead of, the persist attribute to specify the manner in which content streams are played. For example, a Boolean concurrency attribute for a particular content stream S might indicate whether other content streams that have a media type different than S can be played simultaneously with S. As another example, a Boolean supplant attribute for a particular content stream S might indicate whether S can supplant a currently-playing content stream of the same media type, perhaps even when the current stream has persist equal to true.

As will be further appreciated by those skilled in the art, some embodiments of the present invention might employ attribute values that are dynamically-evaluated conditions (e.g., supplant=(currentStream.timeleft( )<10), etc.), or might employ attributes that have data types other than Boolean (e.g., minTimePlayed=4, etc.). Furthermore, some embodiments of the present invention might employ another scripting language instead of, or in addition to, VXML (e.g., Speech Application Language Tags [SALT], etc.), and it will be clear to those skilled in the art, after reading this specification, how to make and use such embodiments.

At task 770, the thread stops the current content stream of channel $C_T$, in well-known fashion.

At task 780, the thread checks whether ordered list L' is empty. If so, the thread terminates, otherwise, execution continues back at task 720.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment" "in an embodiment" or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
   (a) receiving a list of one or more identifiers at a thread of an interactive voice response system,
      (i) wherein each of said identifiers is associated with one of a plurality of content streams,
      (ii) wherein each of said content streams has one or more of a plurality of media types,
      (iii) wherein said list specifies a playback order for said content streams, and
      (iv) wherein said thread is associated with one of said media types T and with a call that involves said interactive voice response system and a telecommunications terminal; and
   (b) executing in said thread a command for initiating delivery of one of said content streams S to said telecommunications terminal,
      (i) wherein said content stream S has said media type T,
      (ii) wherein the time $\tau$ at which delivery of said content stream S begins is based on said playback order, and
      (iii) wherein an attribute value V indicates whether said content stream S can be delivered to said telecommunications terminal at the same time as another one of said content streams whose media type is different than T.

2. The method of claim 1 wherein another attribute value W indicates whether playback of said content stream S must finish before playback of another one of said content streams that has said media type T.

3. The method of claim 2 wherein said time $\tau$ is also based on said attribute value W.

4. The method of claim 1 wherein another attribute value W indicates whether said content stream S can supplant another one of said content streams that has said media type T and is being delivered to said telecommunications terminal.

5. The method of claim 4 wherein said time $\tau$ is also based on said attribute value W.

6. The method of claim 1 wherein said time $\tau$ is also based on said attribute value V.

7. A method comprising:
   (a) receiving a list of one or more identifiers at a thread of an interactive voice response system,
      (i) wherein each of said identifiers is associated with one of a plurality of content streams,
      (ii) wherein each of said content streams has one or more of a plurality of media types,
      (iii) wherein said list specifies a playback order for said content streams, and
      (iv) wherein said thread is associated with one of said media types T and with a call that involves said interactive voice response system and a telecommunications terminal; and
   (b) executing in said thread a command for initiating delivery of one of said content streams S to said telecommunications terminal,
      (i) wherein said content stream S has said media type T,
      (ii) wherein the time $\tau$ at which delivery of said content stream S begins is based on said playback order, and
      (iii) wherein said thread also receives an attribute value V that is associated with another one of said content streams R, and wherein said time $\tau$ is also based on said attribute value V.

8. The method of claim 7 wherein said content stream R has a media type different than said media type T.

9. A method comprising:
   (a) spawning a thread at an interactive voice response system during a call that involves said interactive voice response system and a telecommunications terminal; and
   (b) passing to said thread (i) a list of one or more identifiers, and (ii) an attribute value;
   wherein each of said identifiers is associated with one of a plurality of content streams; and wherein each of said content streams has one or more of a plurality of media types; and wherein said list specifies a playback order for said content streams; and wherein said thread is associated with said call and with one of said media types T; and wherein said thread is for initiating delivery of one of said content streams S that has said media type T to said telecommunications terminal during said call in accordance with said playback order; and wherein said attribute value indicates whether said content stream S can be delivered to said telecommunications terminal at the same time as another one of said content streams whose media type is different than T.

10. The method of claim 9 wherein said thread is also passed (iii) another attribute value that indicates whether playback of said content stream S must finish before playback of another one of said content streams that has said media type T.

11. The method of claim 9 wherein said thread is also passed (iii) another attribute value that indicates whether said content stream S can supplant another one of said content streams that has said media type T and is being delivered to said telecommunications terminal.

12. The method of claim 9 wherein said thread is spawned by a script for said interactive voice response system.

13. The method of claim 12 wherein said script is a Voice eXtensible Markup Language script.

14. A method comprising:
 (a) spawning a first thread at an interactive voice response system during a call that involves said interactive voice response system and a telecommunications terminal;
 (b) passing to said first thread an attribute value and a first list of one or more identifiers,
  (i) wherein each of said identifiers in said first list is associated with one of a plurality of content streams,
  (ii) wherein each of said content streams has one or more of a plurality of media types, and
  (iii) wherein the order of said identifiers in said first list specifies a playback order $P_1$ for the associated content streams;
 (c) spawning a second thread at said interactive voice response system during said call; and
 (d) passing to said second thread a second list of one or more identifiers;
  (i) wherein each of said identifiers in said second list is associated with one of said plurality of content streams, and
  (ii) wherein the order of said identifiers in said second list specifies a playback order $P_2$ for the associated content streams;

wherein said first thread is associated with said call and with one of said media types $T_1$; and wherein said first thread is for initiating delivery of one of said content streams $S_1$ that has said media type $T_1$ to said telecommunications terminal during said call in accordance with said playback order $P_1$; and wherein said second thread is associated with said call and with another one of said media types $T_2$; and wherein said second thread is for initiating delivery of another one of said content streams $S_2$ that has said media type $T_2$ to said telecommunications terminal during said call in accordance with said playback order $P_2$; and wherein said attribute value indicates whether said content stream $S_1$ can be delivered to said telecommunications terminal at the same time as another one of said content streams whose media type is different than $T_1$.

15. The method of claim 14 wherein said first thread is also passed another attribute value that indicates whether playback of said content stream $S_1$ must finish before playback of another one of said content streams that has said media type $T_1$.

16. The method of claim 14 wherein said first thread is also passed another attribute value that indicates whether said content stream $S_1$ can supplant another one of said content streams that has said media type $T_1$ and is being delivered to said telecommunications terminal.

17. The method of claim 14 wherein said thread is spawned by a script for said interactive voice response system.

\* \* \* \* \*